(12) United States Patent
Yoshie

(10) Patent No.: US 9,208,981 B2
(45) Date of Patent: *Dec. 8, 2015

(54) INFORMATION DEVICE

(71) Applicant: Seiko Epson Corporation, Tokyo (JP)

(72) Inventor: Shinichi Yoshie, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 68 days.

This patent is subject to a terminal disclaimer.

(21) Appl. No.: 14/246,993

(22) Filed: Apr. 7, 2014

(65) Prior Publication Data

US 2014/0217834 A1    Aug. 7, 2014

Related U.S. Application Data

(63) Continuation of application No. 12/915,498, filed on Oct. 29, 2010, now Pat. No. 8,736,116.

(30) Foreign Application Priority Data

Nov. 13, 2009   (JP) ................ 2009-259647

(51) Int. Cl.
*H01H 47/00* (2006.01)
*H02J 7/00* (2006.01)
*G06F 1/26* (2006.01)
*G06F 1/32* (2006.01)

(52) U.S. Cl.
CPC ............... *H01H 47/00* (2013.01); *G06F 1/26* (2013.01); *G06F 1/3203* (2013.01); *Y10T 307/826* (2015.04)

(58) Field of Classification Search
USPC ........................................... 307/125
See application file for complete search history.

(56) References Cited

U.S. PATENT DOCUMENTS

| 7,315,097 B2 | 1/2008 | Tajika |
| 2004/0100740 A1 | 5/2004 | Iwashita |

FOREIGN PATENT DOCUMENTS

| JP | 11-069796 A | 3/1999 |
| JP | 2001-309655 A | 11/2001 |
| JP | 2004-040858 A | 2/2004 |
| JP | 2004-180433 A | 6/2004 |
| JP | 2005-312162 A | 11/2005 |
| JP | 2006-166561 A | 6/2006 |

*Primary Examiner* — Rexford Barnie
*Assistant Examiner* — Dru Parries

(57) ABSTRACT

A compact information device in which a shortened unlatch time is enabled so such device can transition from a power cutoff mode to a power supply mode to resume supplying power to internal circuits as a result of a latch circuit unlatching a control signal. Embodiments of such a device, which may be a printer, includes a CPU, a power switch, a capacitor, a switch circuit, an unlatch signal generating unit, and a switch control signal generator, which may include a latch circuit, and a potential difference detection circuit. The latch circuit and potential difference detection circuit operate with voltage Vin2. The CPU outputs a start latch signal VLT when the operating mode changes from the power supply mode to the power cutoff mode. When the power switch is turned off, the potential difference detection circuit outputs an unlatch signal VRST. When the unlatch signal VRST is input, the latch circuit unlatches the control signal.

1 Claim, 10 Drawing Sheets

INFORMATION DEVICE

CROSS-REFERENCE TO RELATED APPLICATION(S)

This application is a continuation of, and claims priority under 35 U.S.C. §120 on, U.S. application Ser. No. 12/915,498, filed Oct. 29, 2010. This application also claims priority under 35 U.S.C. §119 on Japanese patent application no. 2009-259647, filed Nov. 13, 2009. The content of each such related application is incorporated by reference herein in its entirety.

BACKGROUND

1. Field of Invention

The present invention relates to an information device, and more particularly to enabling more rapid resumption of printing operations of an information device having an off mode in which limited power is consumed, when such device is turned on.

2. Description of Related Art

Some printers and other so-called small information devices operate using DC power supplied from an externally connected power supply device. In order to reduce power consumption, demand has grown for information devices that cut off the supply of DC power to internal circuitry including the CPU, or more particularly to components with relatively high power consumption, when the power switch is on but the information device is not used for an extended time and the main functions are not needed.

The European Union's Framework Directive on Eco-Design of Energy-Using Products requires that power consumption be limited to 0.5 W or less when in the off mode, that is, an operating state in which a device is connected to a commercial power source but no device functions are used.

Information devices with an off mode may have a switch circuit that interrupts the supply of DC power to internal circuits, and a latch circuit that holds the switch circuit open, as a power supply cutoff switch for cutting off the supply of DC power to internal circuits. Such information devices may also have a smoothing capacitor for stabilizing the supply voltage, and a discharge circuit including a discharge resistance for discharging any residual charge in the smoothing capacitor as necessary. Note that a capacitor with relatively high capacitance is used as the smoothing capacitor.

When the supply of DC power to the internal circuitry is cut off in such an information device, a start latch signal is input from the CPU to the latch circuit and the latch circuit latches the start latch signal, for example. While the start latch signal is latched, the latch circuit outputs a switch control signal to the switch circuit to hold the switch circuit open. While this switch control signal is input, that is, while the latch circuit latches the start latch signal, the switch circuit remains open and interrupts the supply of DC power to the internal circuitry. In order to resume supply of DC power to the internal circuits from this mode, the power switch of the information device must first be turned off and then turned on again. This is described below.

More specifically, if the power switch of the information device is turned off when the switch circuit is open and the supply of DC power to internal circuits is interrupted, the residual charge in the smoothing capacitor is discharged by the operation of the discharge circuit. When the voltage between the end terminals of the smoothing capacitor drops below the operating voltage of the latch circuit as a result of the residual charge being discharged, the latch circuit unlatches the start latch signal. When the start latch signal is unlatched, the switch circuit closes, and when the power switch turns on again DC power is supplied to internal circuits including the CPU.

See, for example, Japanese Unexamined Patent Appl. Pub. JP-A-2006-166561 and Japanese Unexamined Patent Appl. Pub. JP-A-2005-312162.

This means that the user of the information device may turn the power switch off and then immediately turn the power switch on again in order to resume supplying DC power to the internal circuits as described above. When this happens, however, the residual charge in the smoothing capacitor may not be sufficiently discharged and the latch circuit may not unlatch. As a result, DC power cannot be supplied to the internal circuits and the internal circuits cannot operate because the switch circuit remains open even though the power switch was turned on. To eliminate such problems, the time required to unlatch (the unlatch time) may conceivably be shortened by using a resistor with the lowest possible resistance and the greatest possible allowable loss as the discharge resistor disposed in the discharge circuit.

However, because the external dimensions of resistors with such characteristics are relatively large, using such a resistor as a discharge resistor leads to an increase in the size of the information device. Resistors with such characteristics are therefore not desirable for use in such information devices.

SUMMARY OF INVENTION

An information device according to the present invention resumes supplying DC power to internal circuits by unlatching a start latch signal, following interruption of the supply of DC power to internal circuits including a CPU. The unlatch time is advantageously shortened to lessen work disruption, without adding any undesirable components.

One aspect of the invention is embodied in an information device having a plurality of operating modes including a first operating mode in which DC power is supplied and a second operating mode in which supply of DC power is interrupted. The information device comprises a control unit that outputs a start latch signal when the operating mode changes from the first operating mode to the second operating mode; a power switch having an input terminal connected to an external power supply device and an output terminal that changes a connection state between a connection on state and a connection off state; a capacitor having a first terminal connected to the output terminal of the power switch and a second terminal connected to ground; a switch circuit, having a first terminal connected to the output terminal of the power switch and a second terminal directly or indirectly connected to the control unit, that operates in response to a switch control signal, the switch circuit being in an open position in which the supply of DC power to the control unit is cut off when the switch control signal is input to the switch circuit and in a closed position when the switch control signal is not input to the switch circuit; an unlatch signal generating unit that detects the connection state of the power switch, and when the connection state is off, outputs an unlatch signal; and a switch control signal generator configured to receive the start latch signal and the unlatch signal, and further configured to selectively generate the switch control signal based on at least whether or not the unlatch signal is received. The control unit operates by DC power supplied through the second terminal of the switch circuit, and the unlatch signal generating unit and at least a part of the switch control signal generator operate by DC power supplied through the first terminal of the switch circuit.

None of the various connections need be direct; other circuit components such as resistors may be connected between the stated components.

The information device according to this aspect of the invention can operate as described below when the operating mode is the second operating mode and the switch circuit is open.

(1) The operating unit of the power switch changes from the first position to the second position to disconnect its input and output terminals and render the power switch in the off connection state.

(2) The unlatch signal generating unit detects when the power switch turns off, and when it does, outputs an unlatch signal to the switch control signal generator.

(3) A latch circuit in the switch control signal generator unlatches the start latch signal when the unlatch signal is input.

As a result, the latch circuit can unlatch the signal even when the residual charge in the capacitor is not sufficiently discharged and the voltage between the terminals of the capacitor is below the operating voltage of the latch circuit. There is, therefore, no need to use a resistor with low resistance and high allowable loss as the discharge resistor in order to shorten the unlatch time as described above. More specifically, this aspect of the invention enables reducing the size of the information device while also shortening the unlatch time.

Note that as used herein the "connection on state" (or simply that the power switch is on) means at least that the position of the operating unit of the power switch is the closed position. In addition, the "connection state off state" (or simply that the power switch is off) means at least that the position of the operating unit of the power switch is the open position.

According to another aspect, the unlatch signal generating unit includes a potential difference detection circuit that detects the potential difference between the input terminal and output terminal of the power switch, and when the potential difference is greater than or equal to a specified value determines that the connection state is off and outputs the unlatch signal to the switch control signal generator.

The behavior of the information device according to this aspect of the invention is described below.
(1) When the device is in the second operating mode and the switch circuit is open, the operating unit of the power switch changes from the first position to the second position, and the connection of the input terminal and output terminal turns off.
(2) The voltage between the terminals of the capacitor drops, and a potential difference results between the input terminal and the output terminal of the power switch.
(3) The potential difference detection circuit detects this potential difference.
(4) When this potential difference is greater than or equal to a specific value, the power switch is determined to have turned off and the unlatch signal is output to the switch control signal generator.

According to another aspect, a resistor is connected between the first terminal of the capacitor and a power supply terminal of the latch circuit, and the resistance of the resistor is set so that residual charge in the capacitor is discharged within a specified time when the connection state of the power switch turns off.

When the resistance of the resistor is high, current consumption by the resistor decreases. As a result, the drop in the voltage between the terminals of the capacitor is delayed (the discharge time of the residual charge in the capacitor increases) when the power switch turns off. A relatively long time is therefore required for the potential difference detection circuit to detect that a potential difference exceeding a specified level is present between the input terminal of the power switch and the output terminal to which the smoothing capacitor is connected and the unlatch signal is output.

On the other hand, if the resistance of the resistor is low, current flows to the resistor only when the device is in the second operating mode. As a result, the discharge time of the residual charge in the capacitor can be shortened when the power switch turns off without affecting the first operating mode.

In addition, this aspect enables setting the resistance of the resistor with consideration for the discharge time of the capacitor. As a result, the potential difference detection time when the power switch turns off, that is, the time required for a potential difference greater than or equal to a specified level to occur between the input terminal and output terminal of the power switch, can be suitably set.

The time required for the potential difference between the input terminal and output terminal of the power switch to rise above a specified level when the power switch turns off can be shortened the most by setting the resistance of the resistor to the maximum current level allowed in the second operating mode. The current level allowed in the second operating mode is preferably as low as possible in order to minimize power consumption, but depending on product functions may conceivably be desirably increased to shorten the potential difference detection time. The foregoing maximum current may also be determined by various laws, regulations, or product specifications.

According to another aspect, the control unit outputs an unlatch prevention signal to the switch control signal generator while the operating mode is set to the first operating mode, and stops outputting the unlatch prevention signal when the operating mode changes from the first operating mode to the second operating mode; and the switch control signal generator further comprises an unlatch prevention circuit that prohibits the input of the unlatch signal to the latch circuit while the unlatch prevention signal is input.

When the operating mode is set to the first operating mode, the potential difference between the input terminal and output terminal of the power switch may rise above the specific value even when the power switch is on due, for example, to increased contact resistance caused by deterioration of the contacts resulting from sulfides or siloxane deposits on the contact members of the power switch. In such situations, however, the potential difference detection circuit outputs the unlatch signal in the same way as when the power switch is off. As a result, an undesirable unlatch signal may be input to the switch control signal generator. Input of an undesirable unlatch signal and resulting problems are prevented in the information device according to this fourth aspect of the invention by means of the unlatch prevention circuit disposed in the switch control signal generator.

According to another aspect, the switch control signal generator further comprises an OR circuit that receives as an input a state signal from the latch circuit indicating that the start latch signal is latched and the unlatch signal output from the unlatch prevention circuit, and that outputs the switch control signal.

When the power switch turns off while the operating mode is set to the second operating mode in the information device according to this aspect, the latch circuit unlatches due to the unlatch signal and the switch circuit closes. As a result, even though the power switch is off, current could flow from the capacitor to the control unit and the control unit may operate in error. However, because the switch control signal generator in the information device has an OR circuit, the switch control signal generator continues to output a switch control signal to interrupt supply of DC power to the control unit as a result of the unlatch signal output from the unlatch prevention circuit even if the power switch turns off while the operating mode is set to the second operating mode, and the switch circuit can be held open. Control unit operating errors can therefore be prevented.

According to another aspect, the control unit includes an error detection unit that detects a specific error in the information device; and the error detection unit outputs the start latch signal to the switch control signal generator when the error is detected.

When the error detection unit detects a specific error in an information device according to this sixth aspect of the invention, the switch control signal generator outputs a switch control signal to cutoff supply of DC power to the control unit as a result of the latch circuit latching the start latch signal. Therefore, when a specific error is detected by the error detection unit, the switch circuit opens and supply of DC power to the control unit can be stopped. As a result, problems can be prevented from becoming greater when a problem occurs in the control unit. Note that errors detected by the error detection circuit include, for example, overvoltage errors, low voltage errors, short circuit errors, and other errors from which recovery is possible by turning the power off and then on again.

An information device according to any of the foregoing configurations may comprise a printer.

Because printers are relatively small information devices, these aspects of the invention are particularly well suited thereto.

In addition to hardware embodiments of an information device as described above, the invention can also be rendered as a control method for an information device.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

A. Embodiment 1

A1. System Configuration

Figure 1:
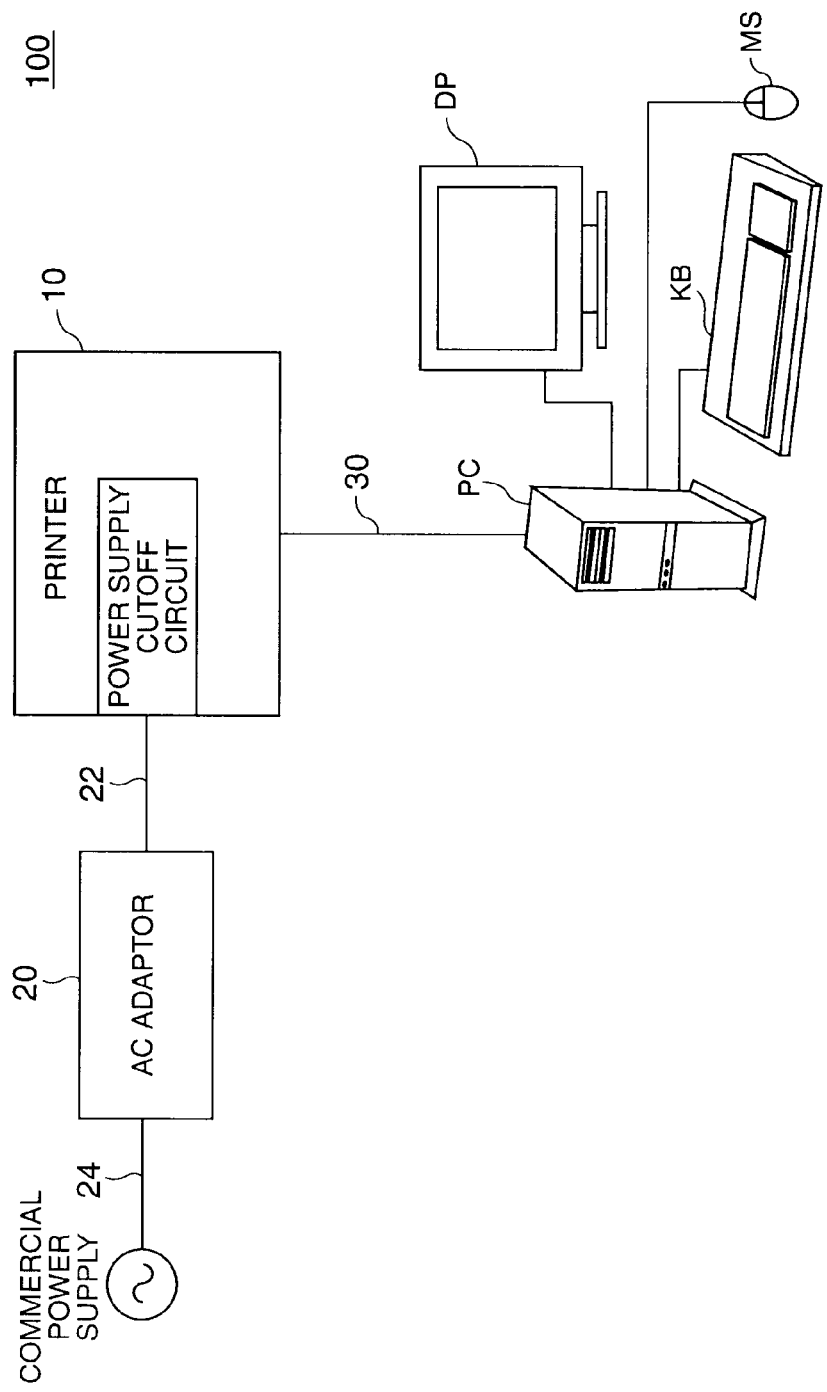
FIG. 1 schematically describes the configuration of a computer system 100 that includes an information device as a first embodiment of the invention.

FIG. 1 schematically describes the configuration of a computer system 100 that includes an information device as a first embodiment of the invention. This computer system 100 includes a personal computer PC and a printer 10 as an example of an information device according to the invention.

An AC adaptor 20 is connected to the printer 10 through a power cable 22. The AC adaptor 20 is connected to a commercial power supply through power cable 24. The AC adaptor 20 converts the AC power supplied from the commercial power source to DC power, and supplies DC power to the printer 10. The AC adaptor 20 is a power supply device.

A personal computer PC is connected to the printer 10 through a printer cable 30. A keyboard KB, mouse MS, and display DP are connected to the personal computer PC. The printer 10 prints when a print job is received from the personal computer PC.

To suppress power consumption, the printer 10 according to this embodiment of the invention has two operating modes, a power supply mode that is the normal operating mode in which DC power supplied from the AC adaptor 20 is supplied to internal circuits including a CPU, and a power cutoff mode (off mode) in which the supply of DC power to internal circuits is stopped.

When print jobs are not sent from the personal computer PC to the printer 10 for a long time, the operating mode changes from the power supply mode to the power cutoff mode. The printer 10 user can desirably set the delay time for the operating mode to change from the power supply mode to the power cutoff mode.

A power supply cutoff circuit interrupts the supply of DC power to the internal circuits when the operating mode changes from the power supply mode to the power cutoff mode. This power supply cutoff circuit is described in detail below.

Note that the power supply mode includes a normal mode, which is the operating mode used for printing and in which power consumption is relatively high, and an energy conservation mode, which is an operating mode with relatively low power consumption while waiting to receive the next print job for a specific time after one print job ends.

A2. Power Supply Cutoff Circuit Configuration

Figure 2:
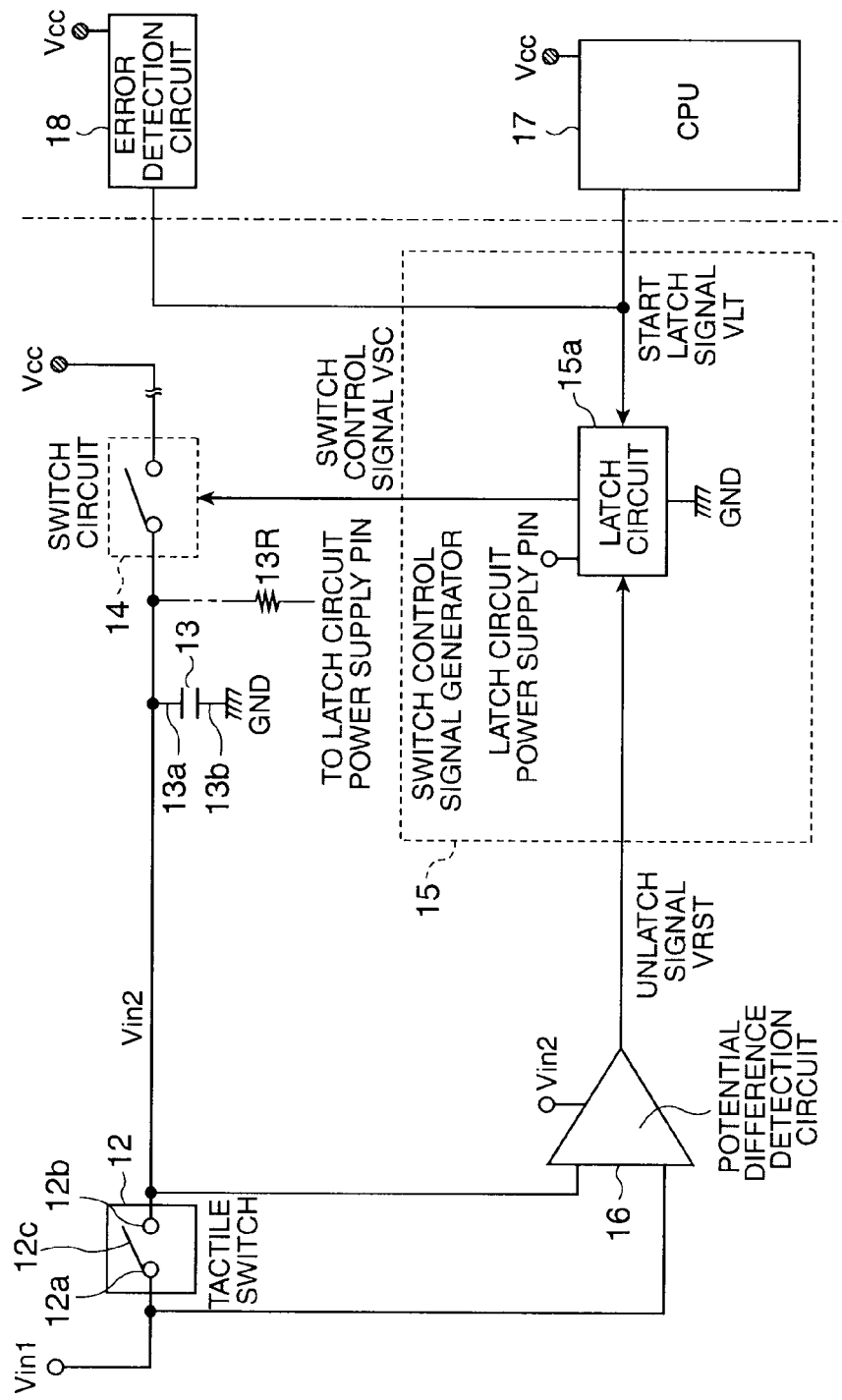
FIG. 2 schematically describes the configuration of a power supply cutoff circuit used in a printer 10 according to a first embodiment of the invention.

FIG. 2 describes the configuration of the power supply cutoff circuit disposed in the printer 10 according to the first embodiment of the invention. As shown in the figure, the power supply cutoff circuit includes a tactile switch 12, smoothing capacitor 13, resistor 13R, switch circuit 14, switch control signal generator 15, and potential difference detection circuit 16. The switch control signal generator 15 includes a latch circuit 15a. The latch circuit 15a goes to ground.

The tactile switch 12 has an input terminal 12a, output terminal 12b, and operating unit 12c. The tactile switch 12 is a power switch that opens and closes by changing the position of the operating unit 12c between a first position where the connection state of the input terminal 12a and output terminal 12b (also referred to below as simply the connection state) is on, and a second position where the connection state is off. Unless the tactile switch 12 is operated, the tactile switch 12 holds the position and the connection state of the operating unit 12c.

The input terminal 12a is connected to the AC adapter 20.

The smoothing capacitor 13 has a first terminal 13a and a second terminal 13b. The first terminal 13a is connected to the output terminal 12b of the tactile switch 12, and the second terminal 13b goes to ground. The smoothing capacitor 13 is a capacitor for stabilizing voltage Vin2. A capacitor with relatively high capacitance is used as this smoothing capacitor 13.

Resistor 13R is connected between the first terminal 13a of the smoothing capacitor 13 and the power supply pin of the latch circuit 15a. When the tactile switch 12 turns off, this resistor 13R is used to discharge residual charge in the smoothing capacitor 13 through the latch circuit 15a. The resistance of this resistor 13R is set according to the power consumption and discharge time required to discharge the residual charge of the smoothing capacitor 13. In this embodiment of the invention the resistance of the resistor 13R is set so that the discharge time is as short as possible while power consumption when the residual charge is discharged is 0.5 W or less (the upper limit of the Eco-Design Directive).

The switch circuit 14 is connected to the output terminal 12b of the tactile switch 12. Based on the switch control signal VSC input from the switch control signal generator 15, the switch circuit 14 switches between supplying and interrupting the supply of DC power to internal circuits including a CPU 17 and error detection circuit 18. When a switch control signal VSC to interrupt the supply of DC power to internal circuits is input, the switch circuit 14 opens. When a switch control signal VSC to interrupt the supply of DC power to internal circuits is not input, the switch circuit 14 closes. DC power passing through the switch circuit 14 is voltage converted (voltage Vcc) by a DC/DC converter not shown, and supplied to the CPU 17 and error detection circuit 18. The switch circuit 14 includes a FET (Field Effect transistor), for example.

Based on a start latch signal VLT input from the CPU 17 or error detection circuit 18, and a unlatch signal VRST input from the potential difference detection circuit 16, the switch control signal generator 15 generates switch control signal VSC and outputs this switch control signal VSC to the switch circuit 14. In this embodiment of the invention, when the start latch signal VLT is input to the latch circuit 15a and the start latch signal VLT is latched by the latch circuit 15a, the switch control signal generator 15 outputs the switch control signal VSC to interrupt the supply of DC power to internal circuits. The latch circuit 15a unlatches when the unlatch signal VRST is input.

When the start latch signal VLT is not latched by the latch circuit 15a, the switch control signal generator 15 does not output the switch control signal VSC to interrupt supply of DC power to internal circuits.

Note that the latch circuit 15a operates using the voltage Vin2 input from the AC adaptor 20 through the resistor 13R downstream from the tactile switch 12.

The potential difference detection circuit 16 detects the potential difference ΔV (Vin1-Vin2) between the input terminal 12a and output terminal 12b of the tactile switch 12, and if the potential difference between the terminals is greater than or equal to a specified value (such as greater than 1 V), outputs the unlatch signal VRST to the switch control signal generator 15. More specifically, the potential difference detection circuit 16 outputs the unlatch signal VRST when the tactile switch 12 is off and the potential difference ΔV between the input terminal 12a and output terminal 12b of the tactile switch 12 is greater than or equal to a specified value.

To change the operating mode from the power supply mode to the power cutoff mode, the CPU 17 outputs the start latch signal VLT to the potential difference detection circuit 16.

When the operating mode of the printer 10 is the power supply mode, the error detection circuit 18 looks for specific errors in the printer 10, and if such an error is detected outputs the start latch signal VLT to the switch control signal generator 15. Errors detected by the error detection circuit 18 include, for example, overvoltage errors, low voltage errors, and short circuit errors. The CPU 17 and error detection circuit 18 are control units as described in the summary of the invention.

A3. Operation of the Power Supply Cutoff Circuit

Figure 3:
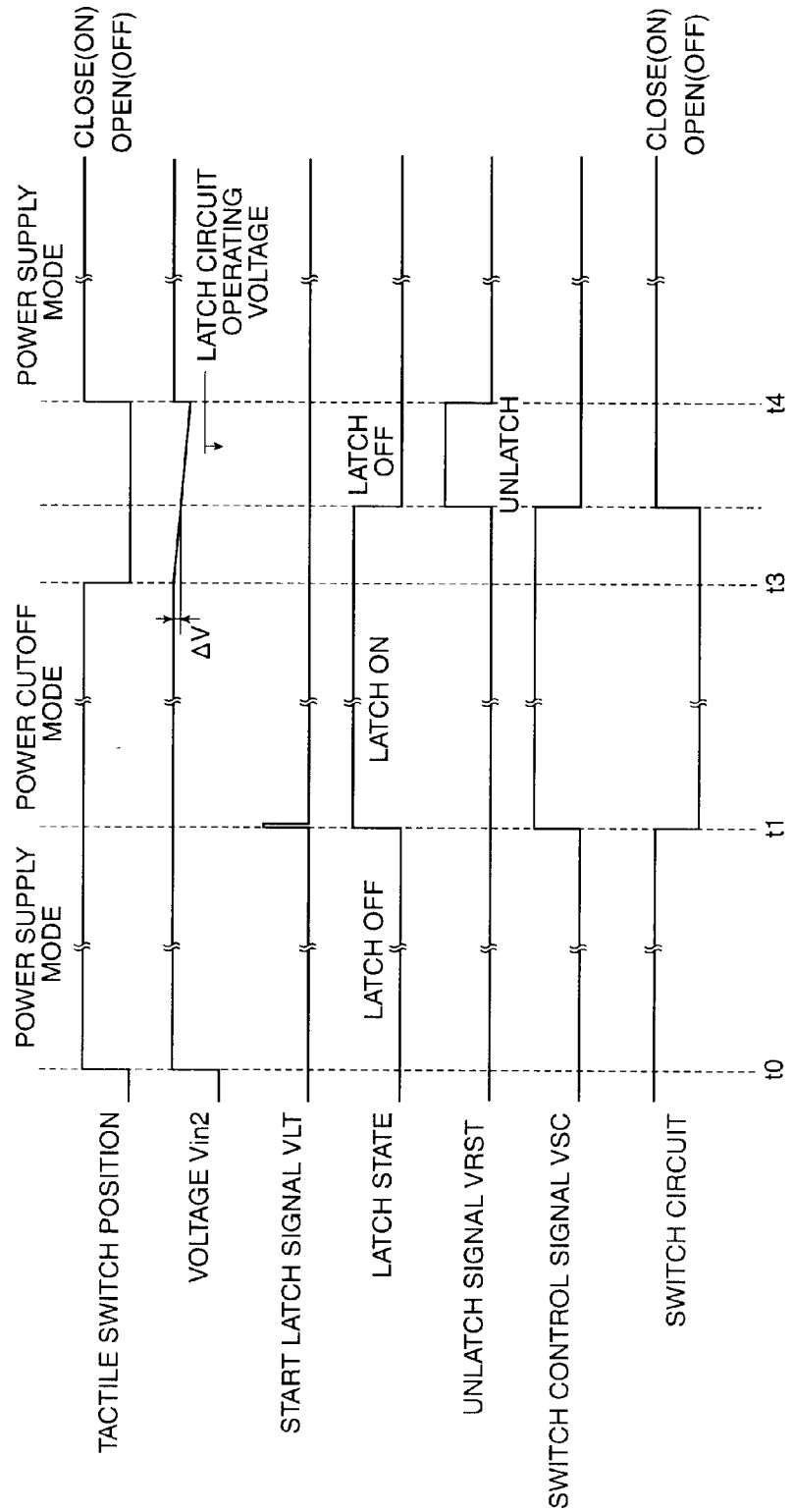
FIG. 3 is a timing chart describing the operation of the power supply cutoff circuit in the printer 10 according to the first embodiment of the invention.

FIG. 3 is a timing chart describing the operation of the power supply cutoff circuit in the printer 10 according to the first embodiment of the invention.

When the position of the operating unit 12c of the tactile switch 12 changes from the second position to the first position at time t0 when the tactile switch 12 is off, the tactile switch 12 turns on, voltage Vin2 rises, and the operating mode of the printer 10 goes to the power supply mode.

The CPU 17 then watches a timer, and at time t1 when a specified time has passed without a print job being sent from the personal computer PC, outputs the start latch signal VLT to change the operating mode of the printer 10 from the power supply mode to the power cutoff mode. When the latch circuit 15a latches this start latch signal VLT (latch state: on), the switch control signal generator 15 outputs the switch control signal VSC that interrupts supply of DC power to internal circuits to the switch circuit 14. When this switch control signal VSC is input to the switch circuit 14, the switch circuit 14 opens. After the switch circuit 14 opens and supply of DC power to internal circuits is interrupted, the operating mode of the printer 10 remains in the power cutoff mode until the tactile switch 12 is turned off and then on again.

In order to reset the operating mode of the printer 10 from the power cutoff mode to the power supply mode, at time t3 the position of the operating unit 12c of the tactile switch 12 changes from the first position to the second position and the tactile switch 12 turns off. When the tactile switch 12 turns off, the residual charge of the smoothing capacitor 13 is discharged through resistor 13R and the latch circuit 15a, and the voltage between the terminals of the smoothing capacitor 13 (voltage Vin2) drops. As a result, a potential difference is produced between the input terminal 12a and output terminal 12b of the tactile switch 12.

If the potential difference detection circuit 16 detects that the potential difference between the input terminal 12a and output terminal 12b of the tactile switch 12 is greater than or equal to a specified value, it outputs the unlatch signal VRST to the switch control signal generator 15.

When this unlatch signal VRST is input to the latch circuit 15a and the latch circuit 15a unlatches (latch state: off), the switch control signal generator 15 stops outputting the switch control signal VSC that interrupts supply of DC power to internal circuits. When input of the switch control signal VSC that interrupts supply of DC power to internal circuits stops, the switch circuit 14 closes.

At time t4 when the position of the operating unit 12c of the tactile switch 12 changes from the second position to the first position and the tactile switch 12 turns on, the operating mode of the printer 10 returns to the power supply mode.

Note that in this embodiment of the invention the time between time t3 and time t4 described above is, for example, approximately 0.5 second, which as the switching time of the operating unit 12c of the tactile switch 12 is relatively short. Therefore, while the residual charge of the smoothing capacitor 13 is discharged through resistor 13R and latch circuit 15a during the period from time t3 to time t4, voltage Vin2 does not drop below the operating voltage of the latch circuit 15a by time t4.

As described above, when the operating mode of the printer 10 is the power supply mode, the error detection circuit 18 looks for specific errors inside the printer 10, and outputs the start latch signal VLT to the switch control signal generator 15 when it detects an error. In this situation, while not shown in the figure, the power supply cutoff circuit operates in the same way as when the start latch signal VLT is output from the CPU 17 at time t1, and the operating mode of the printer 10 changes from the power supply mode to the power cutoff mode.

A4. Effect

To describe the effect of the printer 10 according to the first embodiment of the invention having the power supply cutoff circuit described above, a power supply cutoff circuit used in a printer according to the related art that has a power supply mode and power cutoff mode as operating modes is described below.

Figure 4:
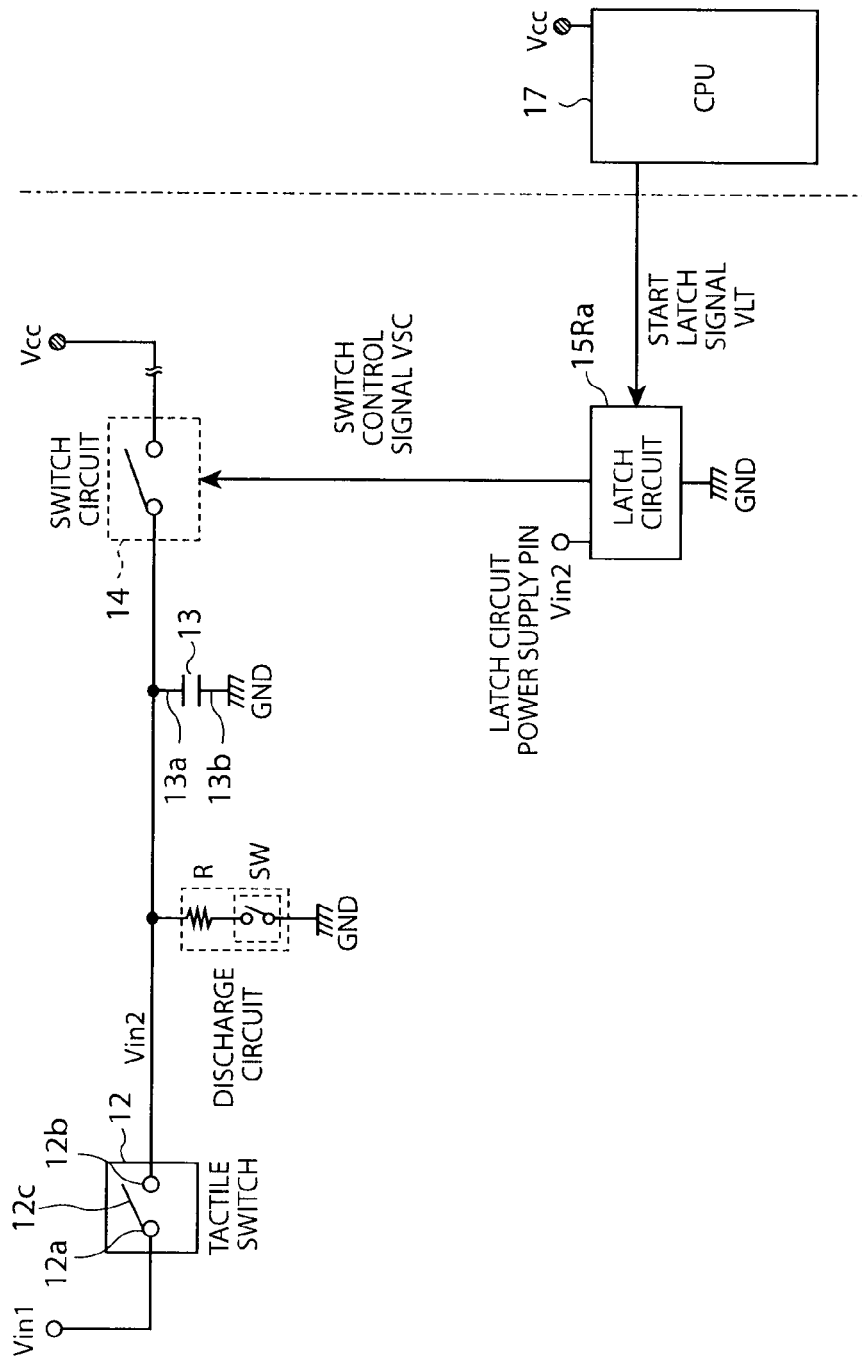
FIG. 4 schematically describes the configuration of a power supply cutoff circuit in a printer according to the related art.

FIG. 4 schematically describes the power supply cutoff circuit used in a printer according to the related art. As will be understood by comparing FIG. 4 and FIG. 2, this power supply cutoff circuit differs from the power supply cutoff circuit used in the printer 10 according to the first embodiment of the invention in that it has a discharge circuit including a discharge resistor R and switch circuit SW, does not have a potential difference detection circuit 16, and does not have an error detection circuit 18. Note that the discharge circuit is a circuit that operates when the tactile switch 12 switches from on to off, and discharges the residual charge of the smoothing capacitor 13.

Figure 5:
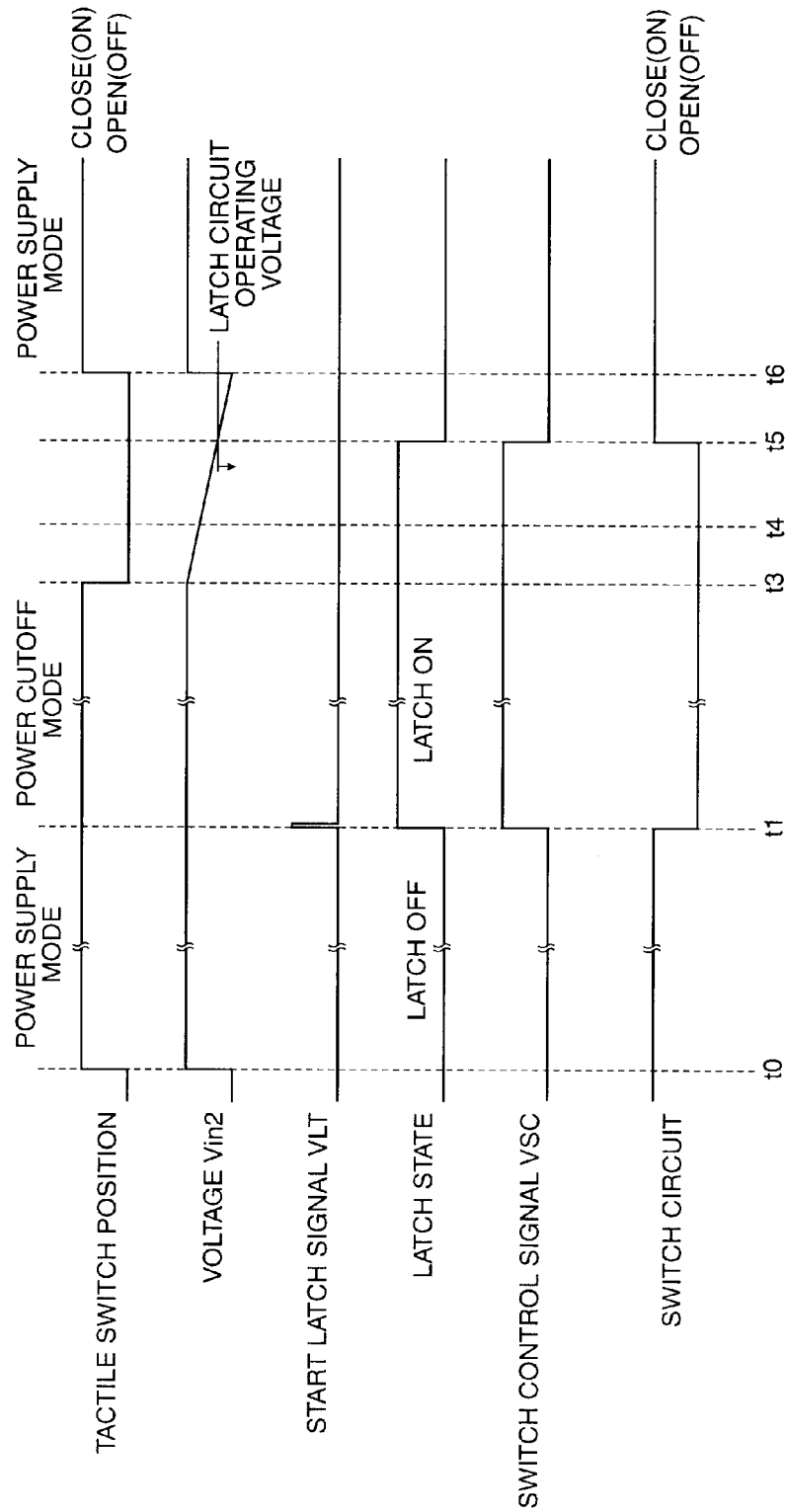
FIG. 5 is a timing chart describing the operation of the power supply cutoff circuit in a printer according to the related art.

FIG. 5 is a timing chart describing the operation of the power supply cutoff circuit in a printer according to the related art. The operation from time t0 to time t3 is the same as the operation of the power supply cutoff circuit in the printer 10 according to the first embodiment of the invention (see FIG. 3).

With the power supply cutoff circuit used in a printer according to the related art, the discharge circuit operates and the residual charge of the smoothing capacitor 13 is discharged when the tactile switch 12 turns off at time t3. When the voltage (voltage Vin2) between the terminals of the smoothing capacitor 13 then drops below the operating voltage of the latch circuit 15Ra at time t5, the latch circuit 15Ra unlatches (latch state: off). When the latch circuit 15Ra unlatches, the switch circuit 14 closes. When the tactile switch 12 then turns on again at time t6, DC power is supplied to the internal circuits.

More specifically, with the power supply cutoff circuit used in a printer according to the related art, the latch circuit 15Ra does not unlatch and the switch circuit 14 remains open until the voltage between the terminals of the smoothing capacitor 13 goes below the operating voltage of the latch circuit 15Ra. Therefore, even if the tactile switch 12 turns on at time t4 before the voltage between the terminals of the smoothing capacitor 13 drops below the operating voltage of the latch circuit 15Ra, the switch circuit 14 remains open and DC power cannot be supplied to internal circuits.

To solve this problem a resistor with the lowest possible resistance and the greatest possible allowable loss may conceivably be used as the discharge resistor R disposed in the discharge circuit to shorten the unlatch time of the latch circuit 15Ra. However, because the external dimensions of resistors with such characteristics are relatively large, using such a resistor as the discharge resistor R leads to an increase in the size of the printer. Resistors with such characteristics are therefore unsuitable for use in printers.

However, because the power supply cutoff circuit of the printer 10 according to the first embodiment of the invention has a potential difference detection circuit 16, the latch circuit 15a can be unlatched by applying the unlatch signal VRST output from the potential difference detection circuit 16. The printer 10 according to the first embodiment of the invention therefore does not need to use a resistor with low resistance and high allowable loss as the discharge resistor R in order to shorten the unlatch time. More specifically, the printer 10 according to the first embodiment of the invention enables both a small printer 10 and shortening the unlatch time.

Furthermore, because the error detection circuit 18 of the printer 10 according to the first embodiment of the invention can output the start latch signal VLT and interrupt the supply of DC power to the internal circuits when a specific error is detected, problems can be prevented from becoming bigger when a problem occurs in the internal circuits.

Furthermore, with the printer 10 according to the first embodiment of the invention, the resistance of the resistor 13R in the power supply cutoff circuit can be set with consideration for the discharge time and power consumption when discharging the residual charge of the smoothing capacitor 13. Therefore, by appropriately setting the operating current of the latch circuit 15a, that is, the current flowing to the resistor 13R, when the operating mode is the power cutoff mode, the time until a potential difference greater than or equal to a specified value is produced between the input terminal 12a and output terminal 12b of the tactile switch 12 (the time until the potential difference is detected) when the tactile switch 12 turns off can be set appropriately.

B. Embodiment 2

A printer according to the second embodiment of the invention has a power supply mode and a power cutoff mode as operating modes similarly to the printer 10 according to the first embodiment of the invention. However, the configuration of the power supply cutoff circuit in the printer according to the second embodiment of the invention differs from that of the printer 10 according to the first embodiment of the invention. The configuration and operation of the power supply cutoff circuit in a printer according to the second embodiment of the invention is described next.

B1. Power Supply Cutoff Circuit Configuration

Figure 6:
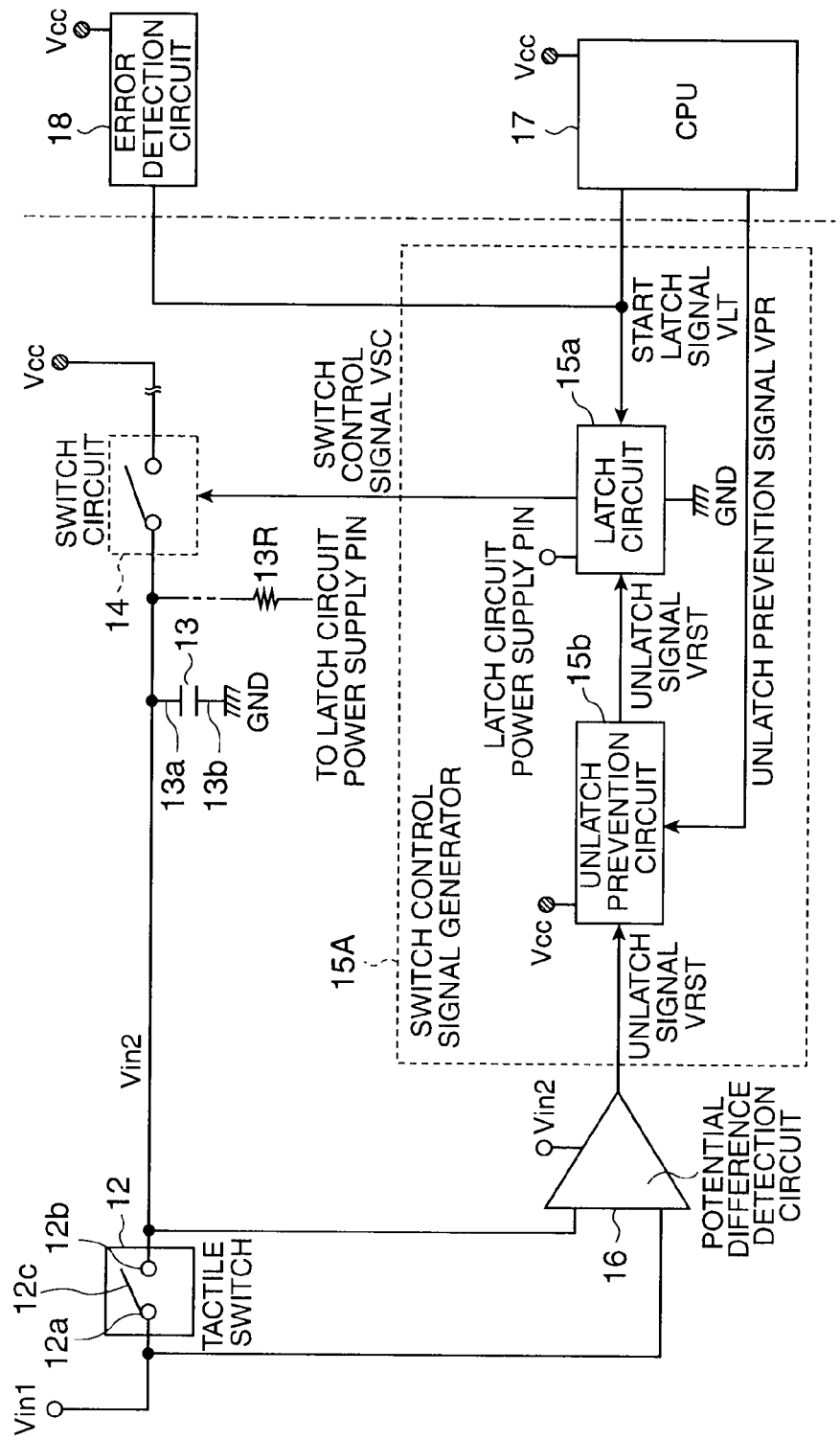
FIG. 6 schematically describes the configuration of a power supply cutoff circuit in a printer according to a second embodiment of the invention.

FIG. 6 schematically describes the configuration of the power supply cutoff circuit in a printer according to the second embodiment of the invention. As will be known by comparing FIG. 6 and FIG. 2, the power supply cutoff circuit of the printer according to the second embodiment of the invention has a switch control signal generator 15A instead of the switch control signal generator 15 used in the first embodiment.

This switch control signal generator 15A has an unlatch prevention circuit 15b in addition to a latch circuit 15a. When the operating mode of the printer 10 is the power supply mode, the CPU 17 outputs an unlatch prevention signal VPR to the unlatch prevention circuit 15b, and when the operating mode changes from the power supply mode to the power cutoff mode, stops output of the unlatch prevention signal VPR (see FIG. 7).

While the unlatch prevention signal VPR is input, the unlatch prevention circuit 15b prohibits output of the unlatch signal VRST from the potential difference detection circuit 16 to the latch circuit 15a.

The configuration of this embodiment is otherwise identical to the configuration of the first embodiment.

B2. Operation of the Power Supply Cutoff Circuit

Figure 7:
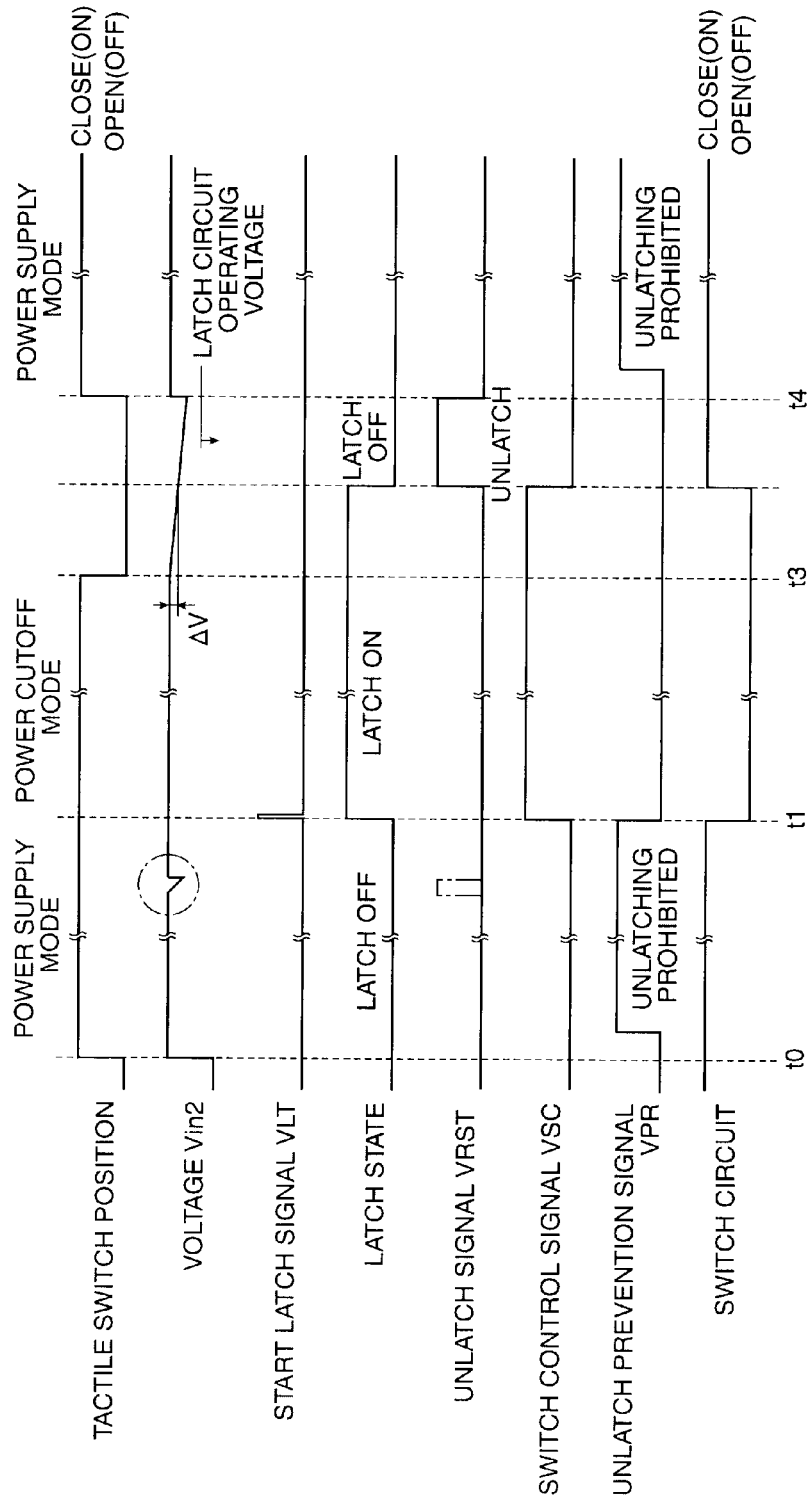
FIG. 7 is a timing chart describing the operation of the power supply cutoff circuit in the printer 10 according to the second embodiment of the invention.

FIG. 7 is a timing chart of the operation of the power supply cutoff circuit in a printer according to the second embodiment of the invention. The operation of the power supply cutoff circuit in the second embodiment is substantially the same as in the first embodiment. However, because the power supply cutoff circuit of the second embodiment also has an unlatch prevention circuit 15b, the unlatch signal VRST output from the potential difference detection circuit 16 is not input to the latch circuit 15a while the operating mode is the power supply mode.

When the operating mode is the power supply mode, a potential difference may occur between the input terminal 12a and output terminal 12b of the tactile switch 12 even when the tactile switch 12 is on. For example, the potential difference may become greater than the specified value as indicated by the dot-dash line in FIG. 7 due to an increase in contact resistance resulting from deterioration of the contacts as a result of sulfides or siloxane, for example, adhering to the contact members of the tactile switch 12. In this situation the potential difference detection circuit 16 outputs the unlatch signal VRST just as if the tactile switch 12 is off (see the unlatch signal VRST in FIG. 7). As a result, when an unlatch prevention circuit 15b is not used, similarly to the switch control signal generator 15 in the first embodiment, the unlatch signal VRST may be undesirably input to the switch control signal generator 15A. However, by rendering an unlatch prevention circuit 15b in the switch control signal generator 15A of the power supply cutoff circuit, the printer according to the second embodiment of the invention can prevent problems caused by input of an undesirable unlatch signal.

As in a printer 10 according to the first embodiment of the invention, the printer according to the second embodiment of the invention can unlatch the latch circuit 15a without using a discharge resistor R by applying an unlatch signal VRST output from the potential difference detection circuit 16 as described above, and thereby enables a small printer size and short unlatch time.

C. Embodiment 3

A printer according to the third embodiment of the invention has a power supply mode and a power cutoff mode as operating modes similarly to the printer 10 according to the second embodiment of the invention. However, the configuration of the power supply cutoff circuit in the printer according to this third embodiment differs from that of the printer 10 according to the second embodiment of the invention. The configuration and operation of the power supply cutoff circuit in a printer according to the third embodiment of the invention is described next.

C1. Power Supply Cutoff Circuit Configuration

Figure 8:
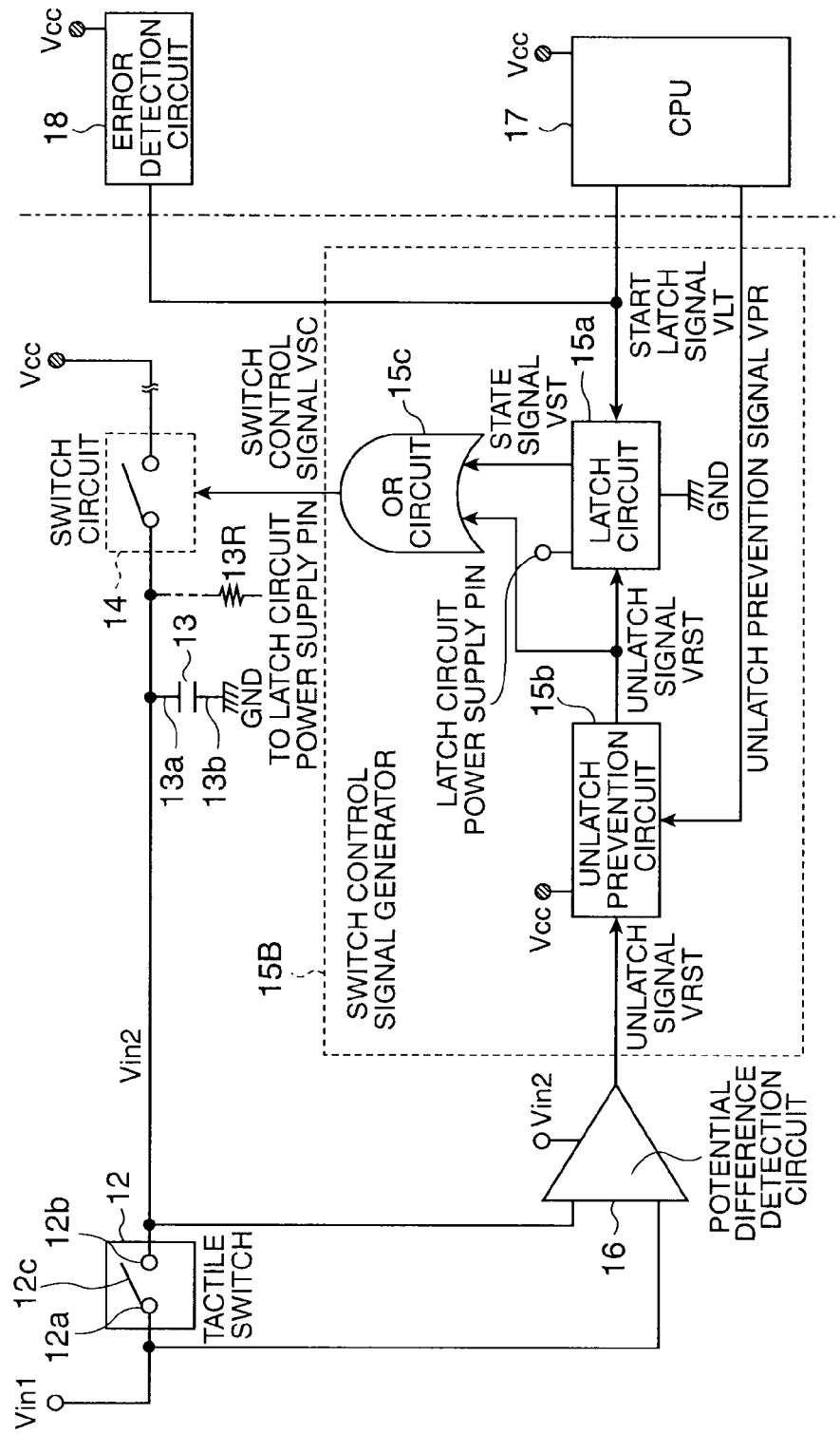
FIG. 8 schematically describes the configuration of a power supply cutoff circuit in a printer according to a third embodiment of the invention.

FIG. 8 schematically describes the configuration of the power supply cutoff circuit in a printer according to the third embodiment of the invention. As will be known by comparing FIG. 8 and FIG. 6, the power supply cutoff circuit of the printer according to the third embodiment of the invention has a switch control signal generator 15B instead of the switch control signal generator 15A used in the second embodiment.

This switch control signal generator 15B has an OR circuit 15c in addition to a latch circuit 15a and unlatch prevention circuit 15b. A state signal VST output from the latch circuit 15a indicating the latch state of the latch circuit 15a, and the unlatch signal VRST passed through the unlatch prevention circuit 15b, are input to the OR circuit 15c.

Note that this state signal VST is the same signal as the switch control signal VSC in the second embodiment. The switch control signal generator 15B outputs the signal output from the OR circuit 15c as the switch control signal VSC to the switch circuit 14.

More specifically, while the state signal VST output from the latch circuit 15a indicating that the start latch signal VLT is latched is input to the OR circuit 15c, or while the unlatch signal VRST is input from the unlatch prevention circuit 15b, the switch control signal generator 15B generates the switch control signal VSC to interrupt the supply of DC power to internal circuits. In addition, when neither the unlatch signal VRST or the state signal VST indicating the start latch signal VLT is latched is input to the OR circuit 15c, the switch control signal generator 15B does not generate the switch control signal VSC to interrupt the supply of DC power to internal circuits.

C2. Operation of the Power Supply Cutoff Circuit

Figure 9:
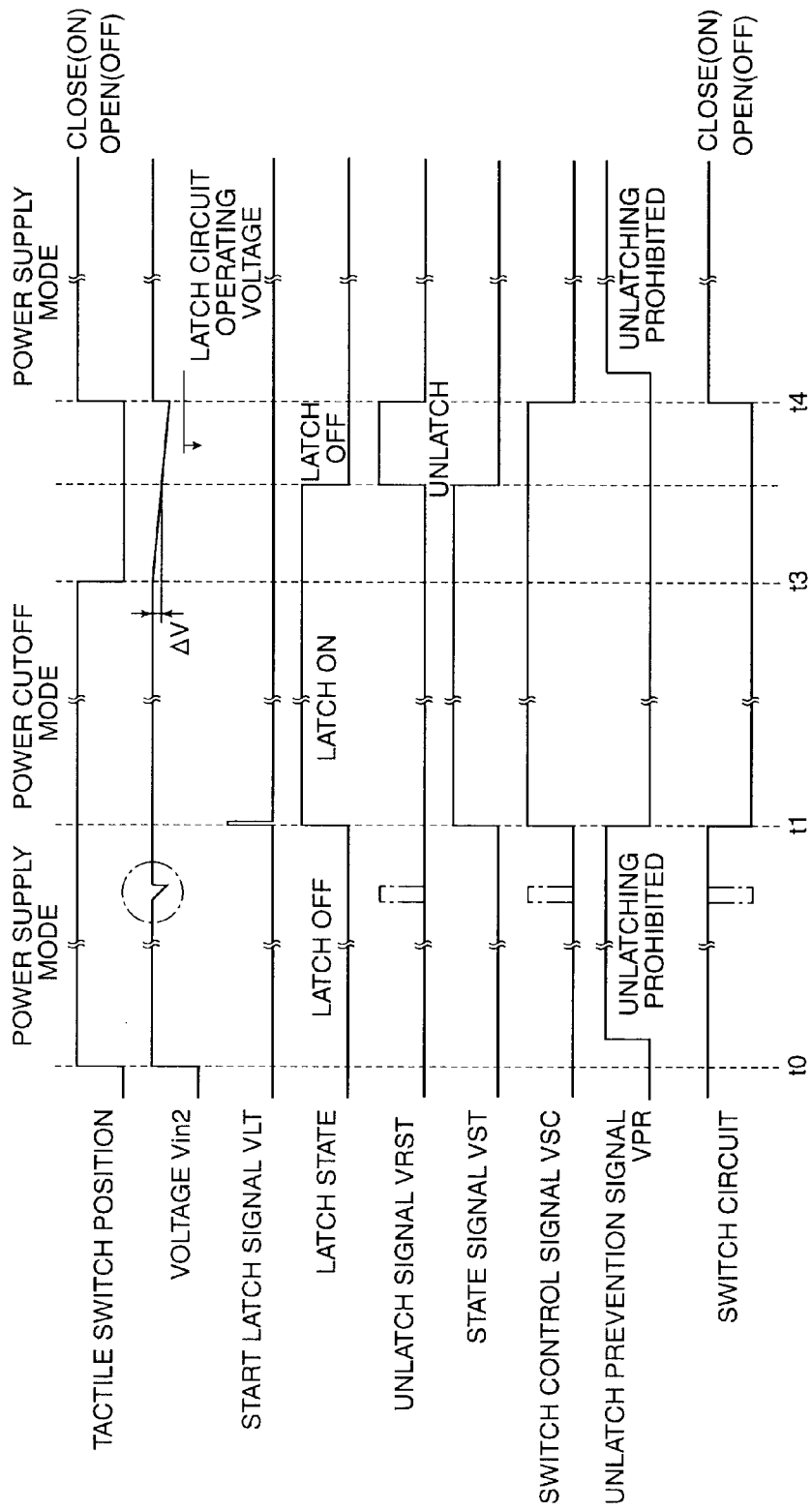
FIG. 9 is a timing chart describing the operation of the power supply cutoff circuit in the printer 10 according to the third embodiment of the invention.

FIG. 9 is a timing chart of the operation of the power supply cutoff circuit in a printer according to the third embodiment of the invention. The operation from time t0 to time t3 is the same as the operation of the power supply cutoff circuit in a printer according to the second embodiment of the invention (see FIG. 7).

With the power supply cutoff circuit used in a printer according to the second embodiment of the invention described above, when the operating mode is the power cutoff mode and the tactile switch 12 turns off at time t3, the latch circuit 15a unlatches due to the unlatch signal VRST and the switch circuit 14 closes. As a result, even though the tactile switch 12 is off, current could flow from the smoothing capacitor 13 to the internal circuits including the CPU 17, and internal circuits may operate in error.

With the power supply cutoff circuit used in the printer according to the third embodiment of the invention, however, such operating errors do not occur because the unlatch signal VRST is input to the OR circuit 15c. That is, when the tactile switch 12 turns off at time t3, and the potential difference detection circuit 16 detects the potential difference between the input terminal 12a and output terminal 12b of the tactile switch 12 and outputs the unlatch signal VRST, this unlatch signal VRST is input through the unlatch prevention circuit 15b to the OR circuit 15c. In addition, because this unlatch signal VRST is output from the switch control signal generator 15B to the switch circuit 14 as the switch control signal VSC to open the switch circuit 14, the switch circuit 14 can be held open. Incorrect operation of the internal circuits can therefore be prevented.

Note that if the unlatch prevention circuit 15b is omitted from the power supply cutoff circuit in the printer according to the third embodiment of the invention, the unlatch signal VRST is output from the potential difference detection circuit 16 when the potential difference between the input terminal 12*a* and output terminal 12*b* of the tactile switch 12 is greater than or equal to the specified value as indicated by the dot-dash lines in FIG. 9. This unlatch signal VRST is also output as the switch control signal VSC from the switch control signal generator 15B (OR circuit 15*c*). As a result, the switch circuit 14 may open while the operating mode is set to the power supply mode. This problem is prevented in this embodiment of the invention, however, by the unlatch prevention circuit 15*b*.

As in a printer 10 according to the first embodiment and the printer according to the second embodiment of the invention, the printer according to this third embodiment of the invention can unlatch the latch circuit 15*a* without using a discharge resistor R by applying an unlatch signal VRST output from the potential difference detection circuit 16 as described above, and thereby enables a small printer size and short unlatch time.

D. Other embodiments

Preferred embodiments of the invention are described, but the invention is not so limited and can be varied in many ways without departing from the scope of the accompanying claims. Some examples of such variations are described below.

D1. Variation 1

In the printer 10 according to the first embodiment above the power supply cutoff circuit has a potential difference detection circuit 16, and the potential difference detection circuit 16 outputs an unlatch signal VRST to the switch control signal generator 15, but the invention is not so limited. For example, the power supply cutoff circuit may have an unlatch signal generator that detects the connection state of the input terminal 12*a* and output terminal 12*b* of the tactile switch 12, and outputs unlatch signal VRST to the switch control signal generator 15 if the connection state (tactile switch 12) is off.

Figure 10:
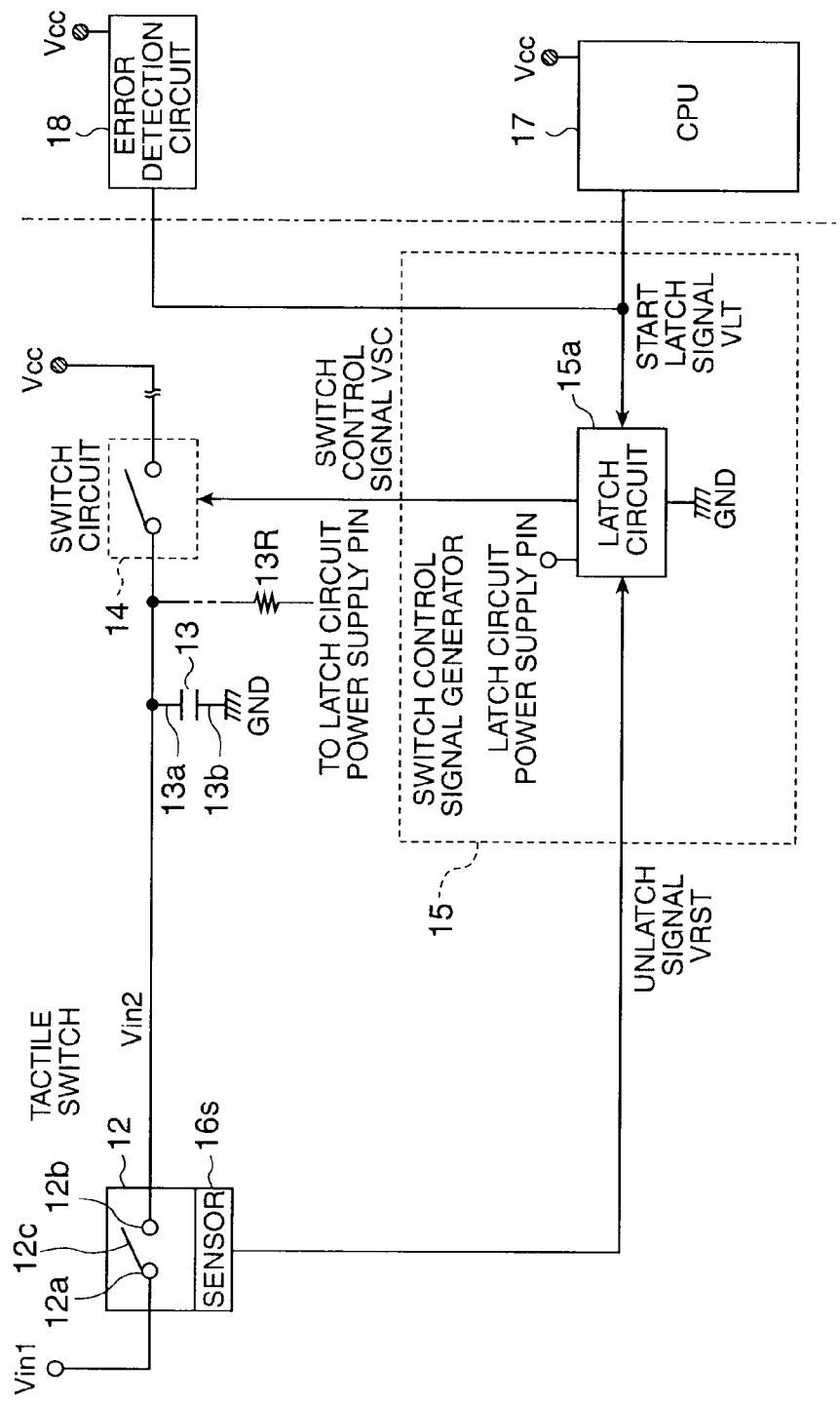
FIG. 10 schematically describes the configuration of a power supply cutoff circuit in a printer according to another embodiment of the invention.

FIG. 10 schematically describes the configuration of the power supply cutoff circuit in a printer according to this variation of the invention. As will be known by comparing FIG. 10 and FIG. 2, the power supply cutoff circuit in a printer according to this variation has a sensor 16*s* instead of the potential difference detection circuit 16 in the first embodiment. This sensor 16*s* detects if the tactile switch 12 is turned off or on.

When the tactile switch 12 is off, the sensor 16*s* outputs the unlatch signal VRST to the switch control signal generator 15. When the tactile switch 12 is on, the sensor 16*s* does not output the unlatch signal VRST to the switch control signal generator 15.

Note that the sensor 16*s* may be any type of sensor that can detect if the tactile switch 12 is off or on, and an optical sensor or ultrasonic sensor, for example, may be used as the sensor 16*s*. The same effect as the printer 10 of the first embodiment can be achieved with the power supply cutoff circuit according to this variation of the invention.

D2. Variation 2

In the embodiments described above the start latch signal VLT output from the error detection circuit 18 is input to the latch circuit 15*a* of the power supply cutoff circuit, but the start latch signal VLT output from the error detection circuit 18 may be omitted.

D3. Variation 3

The embodiments described above use a tactile switch 12 as the power switch disposed to the power supply cutoff circuit, but the invention is not so limited. The power switch used in the invention is generally a power switch that has an input terminal, an output terminal, and an operating unit, and can be any type of switch of which the connection state changes as a result of changing the position of the operating unit between a first position in which the connection state of the input terminal and the output terminal is on, and a second position in which the connection state is off, and which holds the position of the operating unit and connection state unless the operating unit is operated to change position. Examples of such switches include toggle switches, slide switches, and rocker switches.

D4. Variation 4

The invention is described as applied to a printer in the foregoing embodiments, but can obviously also be applied to information devices other than printers.

Although the present invention has been described in connection with the preferred embodiments thereof with reference to the accompanying drawings, it is noted that various changes and modifications will be apparent to those skilled in the art in light of such disclosure. Any and all such changes and/or modifications are intended to be within the scope of the present invention to the extent encompassed by any of the claims of this application.

What is claimed is:

1. An information device having a plurality of operating modes including a first operating mode in which DC power is supplied and a second operating mode in which supply of DC power is interrupted, the information device comprising:

a control unit that outputs a start latch signal when the operating mode changes from the first operating mode to the second operating mode;

a power switch having an input terminal connected to an external power supply device and an output terminal that changes a connection state between a connection on state and a connection off state;

a capacitor having a first terminal connected to the output terminal of the power switch and a second terminal connected to ground;

a switch circuit, having a first terminal connected to the output terminal of the power switch and a second terminal directly or indirectly connected to the control unit, that operates in response to a switch control signal, the switch circuit being in an open position in which the supply of DC power to the control unit is cut off when the switch control signal is input to the switch circuit and in a closed position when the switch control signal is not input to the switch circuit;

an unlatch signal generating unit that detects the connection state of the power switch, and when the connection state is off, outputs an unlatch signal; and a switch control signal generator configured to receive the start latch signal and the unlatch signal, and further configured to selectively generate the switch control signal based on at least whether or not the unlatch signal is received;

wherein the control unit operates by DC power supplied through the second terminal of the switch circuit, and the unlatch signal generating unit and at least a part of the switch control signal generator operate by DC power supplied through the first terminal of the switch circuit.

* * * * *